United States Patent [19]

Wolfe et al.

[11] 4,054,799

[45] Oct. 18, 1977

[54] X-RAY PHOSPHOR COMPOSITION AND X-RAY INTENSIFYING SCREEN EMPLOYING SAME

[75] Inventors: Robert Wade Wolfe, Wysox; Russell Francis Messier, Ulster, both of Pa.

[73] Assignee: GTE Sylvania Incorporated, Stamford, Conn.

[21] Appl. No.: 624,742

[22] Filed: Oct. 23, 1975

[51] Int. Cl.² .................. G01T 1/20; C09K 11/46; C09K 11/38
[52] U.S. Cl. .................. 250/486; 250/483; 252/301.4 H; 252/301.5; 428/539
[58] Field of Search .............. 250/483, 486, 487, 460; 427/65; 428/539; 252/301.4 H, 301.5

[56] References Cited

U.S. PATENT DOCUMENTS

| | | | |
|---|---|---|---|
| 1,602,593 | 10/1926 | Sheppard | 252/301.5 |
| 2,904,689 | 9/1959 | Masi et al. | 250/487 |
| 3,023,313 | 2/1962 | La Mater et al. | 252/301.5 X |
| 3,668,143 | 6/1972 | Luckey | 252/301.5 X |

FOREIGN PATENT DOCUMENTS 7,206,945   11/1973   Netherlands

*Primary Examiner* — Jack Cooper
*Attorney, Agent, or Firm* — Norman J. O'Malley; Donald R. Castle; John C. Fox

[57] ABSTRACT

A mixture of from 5% to 95% by weight of calcium tungstate and from 5% to 95% of europium activated barium fluorochloride exhibits brightness and x-ray absorption characteristics superior to that which would be predicted from the foregoing properties of the individual phosphors. Intensifying screens employing the above mixtures have a speed in excess of the commercially available intensifying screens using the present calcium tungstate x-ray phosphors.

6 Claims, 4 Drawing Figures

X-RAY PHOSPHOR COMPOSITION AND X-RAY INTENSIFYING SCREEN EMPLOYING SAME

BACKGROUND OF THE INVENTION

1. Field of the Invention

This invention relates to x-ray phosphors and x-ray intensifying screens. More particularly, it relates to x-ray phosphors that can enable an impure calcium tungstate which is unsuitable for x-ray purposes to be used along with europium-activated barium fluorochloride.

2. Prior Art

Calcium tungstate has been employed as the accepted standard phosphor in medical x-ray intensifying screens for over 50 years. During this time the phosphor has been greatly improved through the development of improved synthesis techniques and purer raw materials. Elimination of the transition metals in particular is most important, as relatively small amounts quench luminescence drastically, as disclosed in "Some Aspects of the Luminescence of Solids", F. A. Kroger, Elsevier, 1940, page 138. It is also believed that ionic impurities contribute to the phosphor's "lag," that is, the phosphorescence that persists after cessation of exciting radiation. There are several methods known in the art to reduce lag, such as purposeful addition of vanadium, molybdenum, and sulfates. These additives are disclosed in U.S. Pat. Nos. 1,602,593, 1,602,594 and 2,729,606. To produce the brightest commercial $CaWO_4$, high purity is essential combined with well-controlled firing procedures and judicious use of a lag-killing agent to ensure maximum brightness. The phosphor produced by this process is expensive, reflecting the overhead costs of purification of the raw materials and the usual multiple firings given to produce maximum brightness.

It has been known for some time that certain alkaline earth halides luminesce under x-ray excitation. U.S. Pat. No. 2,303,963 discloses a procedure for preparing barium fluorochloride. That patent, however, does not mention any activator.

Great Britian Patent No. 1,161,871 and 1,254,271 also disclose processes for preparing various x-ray phosphors including europium-activated barium fluorochloride. Netherlands Patent 7,206,945 discloses a variety of alkaline earth halides activated by europium.

In view of the foregoing description of producing a commercial $CaWO_4$ phosphor, it is clear that a phosphor of an equivalent brightness which is more economical would be an advancement in the art.

Furthermore, it is also believed to be an advancement in the art that mixtures of x-ray grade calcium tungstate and europium-activated barium fluorochloride enable screens to be made which have a brightness superior to either phosphor used individually.

OBJECTS AND SUMMARY OF THE INVENTION

It is an object of this invention to provide an improved x-ray phosphor composition.

It is still another object of this invention to provide an improved x-ray intensifying screen.

It is an additional object of this invention to provide an x-ray intensifying screen having a speed greater than the present commercial x-ray intensifying screen employing the commercially available calcium tungstate x-ray phosphor.

These and other objects of the invention are achieved in one aspect of the invention by providing an x-ray composition consisting essentially of from about 5% to about 95% by weight of a relatively impure calcium tungstate, which alone would be unsuitable for x-ray intensifying screens, and from about 5% to about 95% by weight of europium-activated barium fluorochloride. By relatively impure calcium tungstate it is meant a composition wherein said calcium tungstate contains an impurity greater than 5 parts per million selected from the group consisting of barium, copper, lead, and vanadium. Additionally, mixtures of x-ray grade calcium tungstate and europium-activated barium fluorochloride exhibit synergistic brightness characteristics. By x-ray grade calcium tungstate it is meant a composition contains less than 5 parts per million of impurities selected from the group consisting of barium, copper, lead, and vanadium.

In another aspect of this invention an x-ray conversion screen having an x-ray luminescent coating consisting of $CaWO_4$ with at least 5% by weight of barium fluorochloride activated with europium are equal or superior to commercial screens made from the best commercially available $CaWO_4$. These screens can represent a considerable savings in processing costs because relatively impure materials and a single-firing step can be used in the preparation of the $CaWO_4$. Since both phosphors advantageously emit UV-blue light, normal blue-sensitive x-ray film may be used.

DETAILED DESCRIPTION OF THE PREFERRED EMBODIMENTS

Figure 1:
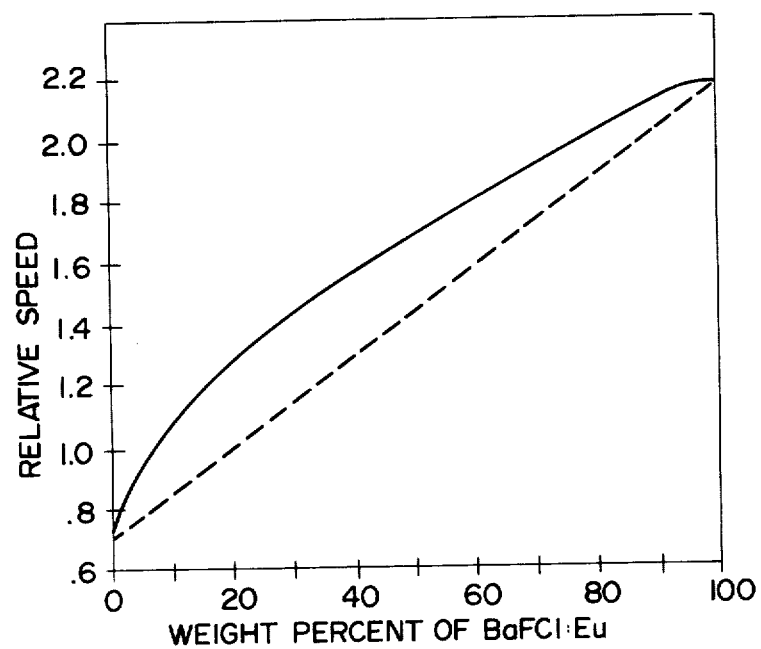
FIG. 1 is a graph showing the speed of compositions of this invention compared with the low grade calcium tungstate and europium-activated barium fluorochloride.
Figure 2:
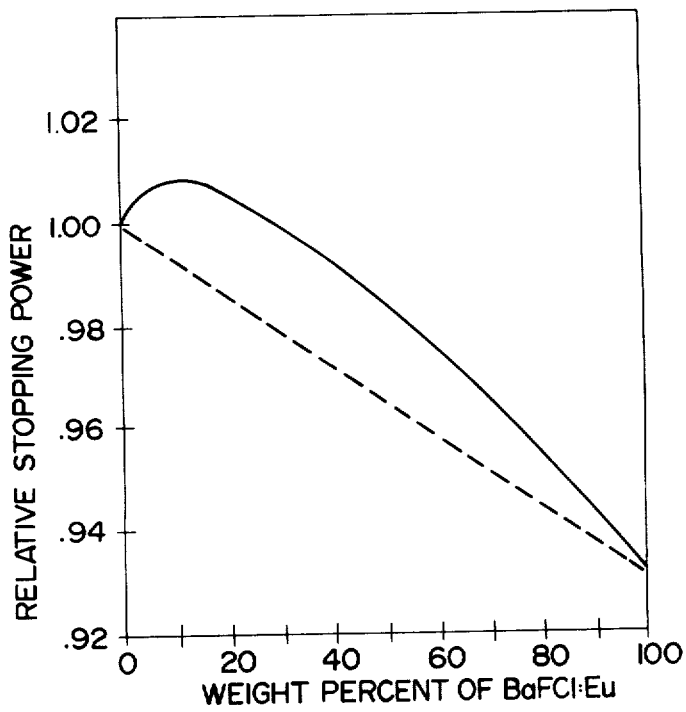
FIG. 2 is a graph illustrating the relative x-ray absorption power of the same compositions as shown in FIG. 1.

For a better understanding of the present invention, together with other and further objects, advantages and capabilities thereof, reference is made to the following disclosure and appended claims in connection with the above-described drawing and brief description.

Not only does the present invention offer advantages when the impure $CaWO_4$ is the major constituent in the invention, the economic and improved property advantages are achieved throughout the spectrum of the mixtures and with mixture employing x-ray grade calcium tungstate and BaFCl:Eu. For example, a 5% impure $CaWO_4$, 95% BaFCl:Eu mixture is cheaper than a pure BaFCl:Eu and has a speed equal to BaFCl:Eu and greater x-ray absorption. Throughout the range of mixtures, one or more of the economic, brightness or absorption advantages are achieved when the mixtures are compared to either single phosphor. Furthermore, the advantages are achieved when x-ray grade calcium tungstate and BaFCl:Eu is used, for example, it would be expected that a mixture containing 90% of an x-ray grade $CaWO_4$ and 10% BaFCl:Eu would have a brightness of about 115% of x-ray grade CaWO$_4$ (taken as 100) whereas it has been found that such a mixture is about 130% of the brightness or speed of x-ray grade CaWO$_4$.

The impure CaWO$_4$ material can be prepared by either solid state reactions or by utilizing water soluble calcium and tungsten sources. It is preferred to utilize the solution-type reaction. The methods of preparing the impure CaWO$_4$ are well known in the art, however, a preferred process is given in detail hereinafter. Modifications of the method used for producing the impure CaWO$_4$ will be readily apparent to one skilled in the art.

The metal ions of barium, lead, and copper are removed from x-ray grade CaWO$_4$. Silicon and vanadium are generally held below 10 ppm and strontium below 100 ppm.

To more fully illustrate the invention the following detailed examples are presented. All parts, proportions and percentages are by weight unless otherwise stated.

EXAMPLE I

About 500 parts of low grade CaCl$_2$ hydrate (75% CaCl$_2$) (the type used to melt snow on roads) are dissolved in about 600 parts deionized water. The solution is filtered to remove any undissolved material. A second solution is prepared from about 850 parts of Na$_2$WO$_4$·2H$_2$O dissolved in about 6000 parts of dionized water and filtered. The CaCl$_2$ solution is added to the stirred, boiling Na$_2$WO$_4$ solution. The precipitate is digested for about ½ hour to increase the particle size, dried, mixed with about 10% of KCl as a flux and about 150 parts per million of KVO$_3$ to eliminate persistence. This mixture is fired at about 1000° C for about 3 hours in air, washed, and is ready for use.

The spectrographic analysis of the impure calcium tungstate produced above shows the presence of the following metal ions other than calcium and tungsten at the levels listed in Table I. Table I also shows comparative results of the best commercial grade calcium tungstate.

TABLE I

| Metal | Impure CaWO$_4$ | X-ray Grade CaWO$_4$ |
|---|---|---|
| Al | 10 to 100 ppm | 5 to 50 ppm |
| Ba | 1 to 10 ppm | 0 |
| Cu | 5 to 50 ppm | 0 |
| Fe | 1 to 10 ppm | 1 to 10 ppm |
| Mg | 0.5 to 5 ppm | 5 to 50 ppm |
| Pb | 10 to 100 ppm | 0 |
| Si | 0.01 to 0.1% | 1 to 10 ppm |
| Sr | 0.01 to 0.1% | 10 to 100 ppm |
| V | 10 to 100 ppm | 1 to 10 ppm |

An x-ray intensifying screen made from this impure grade of CaWO$_4$, and containing a phosphor density of about 450 milligrams per square inch, has about 0.7 the speed of the fast CaWO$_4$ screens such as are commercially available from DuPont and sold under the trade name "Lightning Plus". When the impure CaWO$_4$ phosphor prepared above is mixed with barium fluorochloride activated with europium the speed rapidly increases, being approximately equal to a commercial fast tungstate screen (value of "1" in FIG. 1) when about 5% by weight of BaFCl:Eu replaces CaWO$_4$ in the screen coating. FIG. 1 shows the relative speed of screens made from the low grade CaWO$_4$-BaFCl:Eu mixtures also at a phosphor density of 450 milligrams per square inch as a function of BaFCl:Eu content. All of the above data is obtained at 70 KVP using a tungsten target with a blue sensitive film. Note that the relative speed deviates from that expected for a simple mixture (dashed straight line in FIG. 1).

The increased absorption of the mixture probably results from the absorption edges of the important x-ray absorbing elements, barium, and tungsten, lying at different energies, 37 and 69.5 kv respectively. Thus, a mixture of the phosphors stops primary and secondary x-rays at energies which otherwise would pass through the screen. The complimentary nature of the absorption of the two primary absorbers is shown in FIG. 1. In the energy region between 37 and 69.5 kv barium is the superior absorber, while at energies above and below, tungsten is more efficient.

Figure 3:
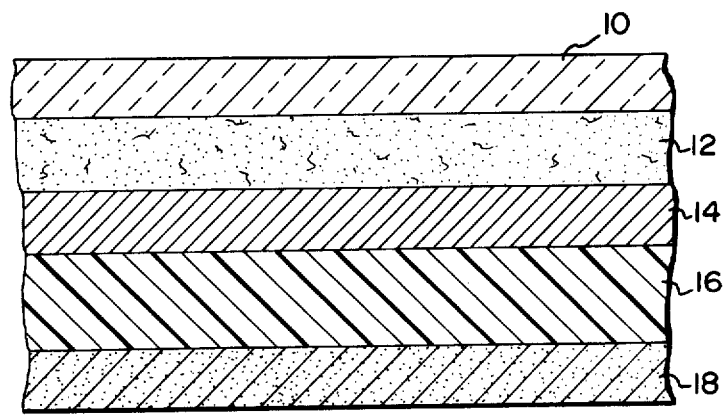
FIG. 3 is a cross-section of an x-ray intensifying screen of this invention.

With particular reference to FIG. 3 there is shown a cross-section of an x-ray intensifying screen of this invention. While the illustration of FIG. 3 shows an embodiment disclosed in U.S. Pat. No. 2,904,689, the present invention is not so limited. In more detail, the intensifying screen shown in FIG. 3 comprises five layers. Layer 10 is a thin protective coating which is transparent to visible light such as a clear plastic. Layer 12 is a layer of the phosphor compositions of this invention. Layer 14 is an optical pigment light-reflecting layer such as titanium dioxide in a suitable binder. The layer can be used, if desired, to reflect light onto the negative. Layer 16 is the base or support of the screen and is paper or plastic. If plastics are used their x-ray absorption should not be high. Suitable materials for the base or support 16 include cellulose acetate, polystyrene, polymethacrylate, and the like. Layer 18 is also an optional layer and is aluminum or a resin containing aluminum particle. For proper function, layer 14 and layer 18 are not essential but can be used if desired.

Figure 4:
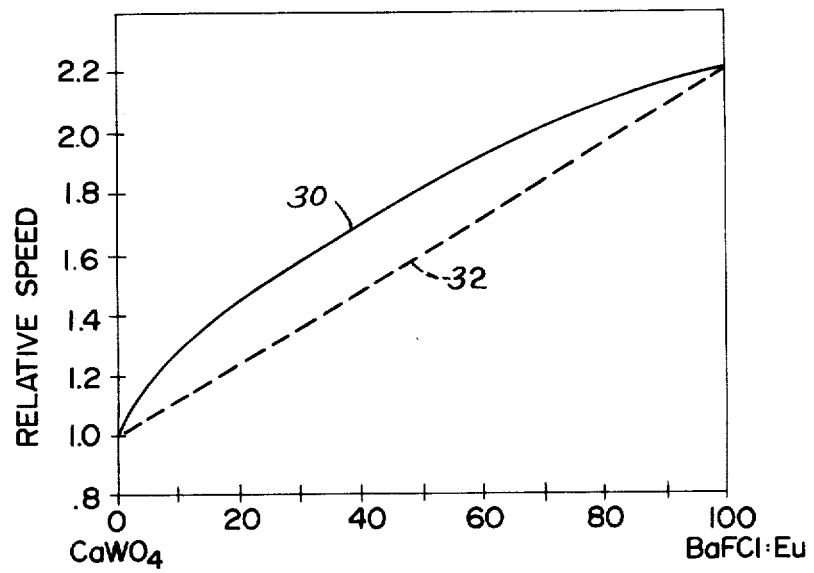
FIG. 4 is a graph showing the comparative speed of composition of x-ray grade calcium tungstate, europium-activated barium fluorochloride and mixtures thereof.

In FIG. 4 there is shown the advantages of using mixtures of x-ray grade calcium tungstate and barium fluorochloride. The upper line 30 is the speed of mixture and the lower line 32 is the predicted speed from the individual brightness. FIG. 4 shows the synergistic effect achieved by the mixtures of this invention.

While there has been shown and described what are at present considered the preferred embodiments of the invention, it will be obvious to those skilled in the art that various changes and modifications may be mader therein without departing from the scope of the invention as defined by the appended claims.

What is claimed is:

1. An x-ray luminescent composition consisting essentially of from about 5% to about 95% by weight of calcium tungstate and from about 5% to about 95% of a europium-activated barium fluorochloride.

2. A composition according to claim 1 wherein said calcium tungstate contains an impurity greater than 5 parts per million selected from the group consisting of barium, copper, lead and vanadium.

3. A composition according to claim 1 wherein said calcium tungstate is an x-ray grade calcium tungstate containing less than 5 parts per million of impurities selected from the group consisting of barium, copper, lead and vanadium.

4. An x-ray intensifying screen comprising a supporting base of material transparent to x-rays, a layer of an x-ray luminescent composition as a coating on said base, said composition consisting of from about 5% to about 95% by weight of calcium tungstate and from about 5% to about 95% by weight of a eruopium-activated barium fluorochloride and a thin protective covering layer over said phosphor layer, said coating layer being substantially transparent to visible light.

5. A screen according to claim 4 wherein said calcium tungstate contains an impurity greater than 5 parts per million selected from the group consisting of barium, copper, lead and vanadium.

6. A screen according to claim 4 wherein said calcium tungstate is an x-ray grade calcium tungstate containing less than 5 parts per million of impurities selected from the group consisting of barium, copper, lead and vanadium.

* * * * *